United States Patent [19]
Miller et al.

[11] Patent Number: 5,475,819
[45] Date of Patent: Dec. 12, 1995

[54] DISTRIBUTED CONFIGURATION PROFILE FOR COMPUTING SYSTEM

[75] Inventors: Steven P. Miller, Newton; Butler W. Lampson, Cambridge, both of Mass.

[73] Assignee: Digital Equipment Corporation, Maynard, Mass.

[21] Appl. No.: 261,741

[22] Filed: Jun. 17, 1994

Related U.S. Application Data

[63] Continuation of Ser. No. 591,784, Oct. 2, 1990, abandoned.
[51] Int. Cl.$^6$ .................................................. G06F 13/14
[52] U.S. Cl. .................. 395/200.03; 395/325; 395/650; 395/200.12; 364/DIG. 2; 364/474.2; 364/974.7; 364/927.96; 364/962
[58] Field of Search ................................. 395/200, 800, 395/325, 650

[56] References Cited

U.S. PATENT DOCUMENTS

| | | |
|---|---|---|
| 4,395,753 | 7/1983 | Comfort et al. . |
| 4,455,605 | 6/1984 | Cormier et al. . |
| 4,553,202 | 11/1985 | Trufyn . |
| 4,814,974 | 3/1989 | Narayanan et al. . |
| 4,823,122 | 4/1989 | Mann et al. ........................ 340/825.28 |
| 5,167,035 | 11/1992 | Mann eet al. ............................ 395/575 |
| 5,341,477 | 8/1994 | Pitkin et al. ............................. 395/200 |
| 5,408,619 | 4/1995 | Oran ......................................... 395/325 |

FOREIGN PATENT DOCUMENTS 0384339  8/1990  European Pat. Off. .

OTHER PUBLICATIONS

Johnson et al, "RPC: the key to distributed software", EXE Magazine, vol. 2, No. 6, U.K., Nov. 1987, pp. 58–61.

Tanenbaum; *Operating Systems: Design and Implementation* pp. 251–263; 272–275; 292–295.

*Primary Examiner*—Alyssa H. Bowler
*Assistant Examiner*—L. Donaghue
*Attorney, Agent, or Firm*—Ronald C. Hudgens; Arthur W. Fisher

[57] ABSTRACT

A distributed computing system using a data communications network may have a number of service providers for a given service or remote procedure call. A client on the network makes reference to a name service to obtain the network address of one of these service providers. The name service maintains for each client or group of clients a configuration profile of the service providers in order to resolve the issue of selecting one of the several service providers when a request is made. A single configuration profile is a priority-ordered search list that maps from a service identifier (e.g., remote procedure call interface specification) into service provider (e.g., remote procedure call server) names. A configuration profile may include names for individual service providers, and/or named groups of service providers, and/or other configuration profiles. Configuration profiles are stored in a manner that makes them accessible throughout the distributed system, e.g., in the name service. Configuration profiles may be chained together by referencing other configuration profiles to provide a hierarchy of configuration profiles.

10 Claims, 3 Drawing Sheets

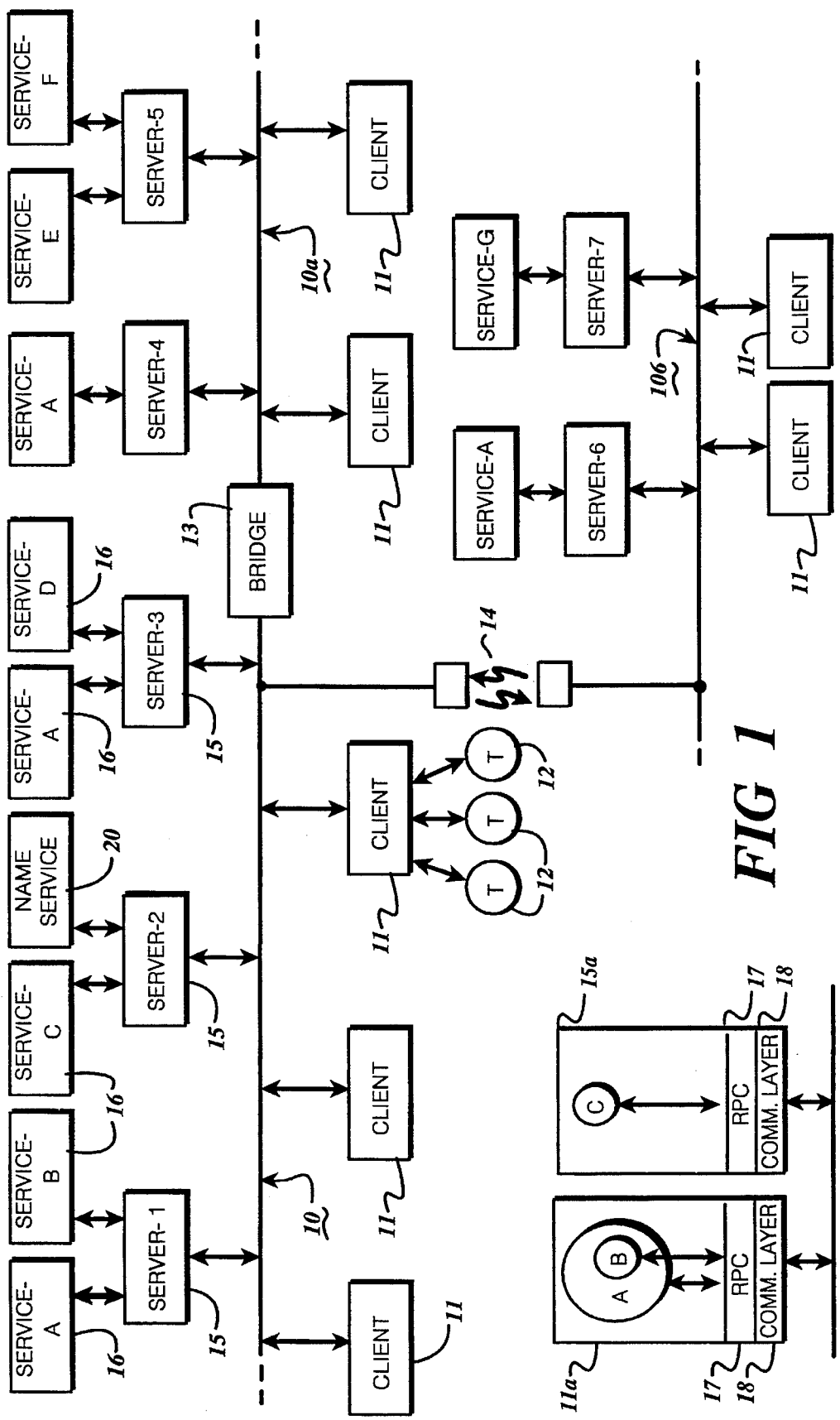

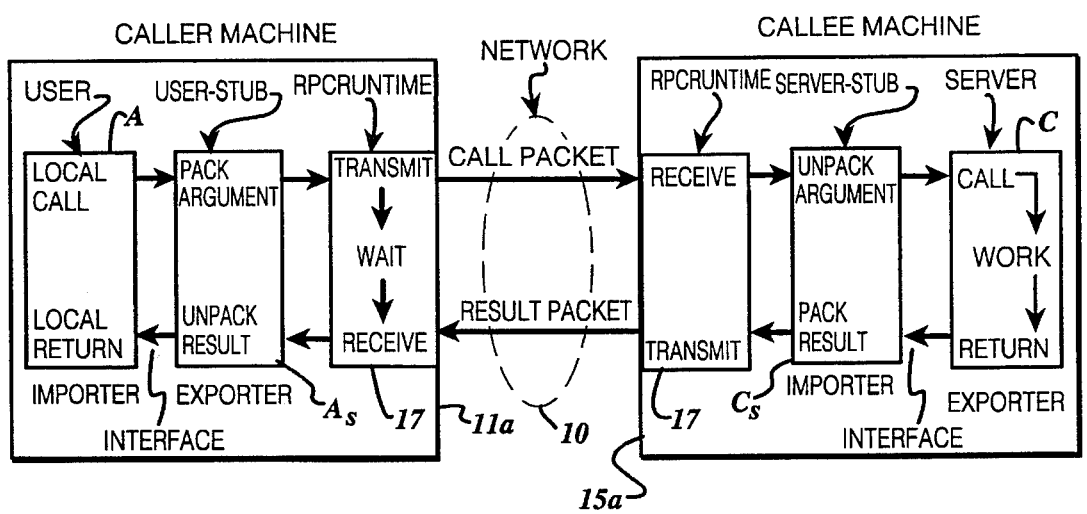
*FIG 3*
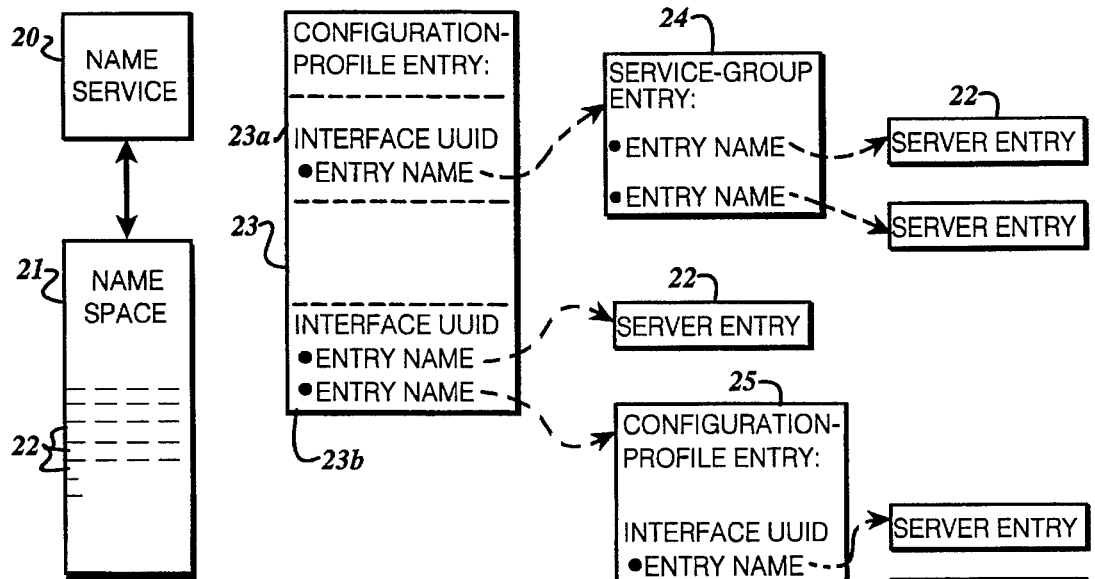
*FIG 4*   *FIG 5*

DISTRIBUTED CONFIGURATION PROFILE FOR COMPUTING SYSTEM

This application is a continuation of U.S. application No. 07/591,784, filed Oct. 2, 1990, now abandoned.

BACKGROUND OF THE INVENTION

This invention relates to distributed computing systems using data communications networks, and more particularly to methods of providing configuration information to clients in a distributed computing system regarding network services or remote procedure calls.

In U.S. Pat. No. 4,823,122, issued Apr. 28, 1989, assigned to Digital Equipment Corporation, assignee of this invention, a communications network is disclosed which is capable of interconnecting local computer terminals with remote service providers using a communications link. The local terminals are coupled to the communications link by interface units which handle network protocol functions for the terminals. One of the functions necessary at the local units is that of obtaining actual network addresses for services known locally only by service names. To perform this translation, service advertisements are periodically sent by the service providers, and a service directory is generated locally from these advertisements. Then, when a service request is generated locally, the service directory is searched to find the corresponding network address of the provider of this service. If there are multiple providers of the same service some mechanism must be provided for selecting the most efficient service provider for a local requester, and for distributing the load among the various providers in an efficient manner.

In U.S. patent application Ser. No. 314,853, filed Feb. 24, 1989, now U.S. Pat. No. 5,341,477, by Richard P. Pitkin and John C. Morency, for "Broker for Computer Inventory Server Selection", a method is disclosed for allocating resources within a computer network by employing a broker mechanism. This broker mechanism operates by monitoring a subset of all available servers capable of delivering the requested service, and allocating based upon a network policy and available resources, to suggest the name of a provider to a service requester.

There are often redundant resources in a distributed system, in order to improve availability and share load. One problem faced by a user (i.e., an applications programmer) in such an environment is selecting a particular resource for use. The user would ideally like means of selecting an instance of a redundant resource that preserves the availability and load sharing, yet may be optimized to the particular environment and/or tailored to the user preferences. For example, when using an remote procedure call service (the resource) that supplies an employee address list, the remote procedure call user may prefer resources within the same LAN, with high speed communications available, to be selected in preference to resources available only via a wide area network. However, if the resources in the local LAN are not available, the remote procedure call user would like to use the remote resources accessible only via the wide area network. Furthermore, the designation of local and remote is relative. Each user, possibly in a different location, may have different views of what is local and what is remote. Therefore, the selection of resources must be able to be tailored to the user and or conditions local to the user.

An objective, then, in a system having redundant distributed resources, is to provide a mechanism that supports the customized selection of resources in a distributed environment, while maintaining availability and load sharing.

SUMMARY OF THE INVENTION

In accordance with one embodiment of the invention, a distributed computing system using a data communications network may have a number of service providers for a given service or remote procedure call. A client on the network makes reference to a name service to obtain the network address of one of these service providers. The name service maintains a configuration profile of the service providers in order to resolve the issue of selecting one of the several service providers when a request is made. A single configuration profile is a priority-ordered search list that maps from a service identifier (e.g., remote procedure call interface specification) into service provider (e.g., remote procedure call server) names. A configuration profile may include names for individual service providers, and/or named groups of service providers, and/or other configuration profiles. Configuration profiles are stored in a manner that makes them accessible throughout the distributed system, e.g. in the name service. Configuration profiles may be chained together by referencing other configuration profiles to provide a hierarchy of configuration profiles.

Configuration profiles address a number of related problems in a distributed system. This is regardless of the fact that the underlying name service is often structured as a single-keyed hierarchy, where the keys do not reflect the service. They provide mechanisms to automatically: (1) efficiently map a (flat) name of a service into a set of service providers; (2) customize the mapping of services into service providers based on a user, system, LAN, site, organization, etc.; (3) provide a hierarchical search path of these mappings; (4) support enhanced availability of service providers; (5) share load amongst service providers; (6) prioritize the selection of a provider within a profile; (7) randomize equal priority selections within a profile; (8) store the profiles in a manner available throughout a distributed system; (9) minimize the configuration management required for systems and users; and (10) minimize the use of well-known names. These mechanisms support user or site defined service utilization policies.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

FIG. 1 is an electrical diagram in block form of a distributed computing system employing a data communication network which may use features of the invention;

FIG. 2 is a schematic representation of processors such as those in FIG. 1 when executing a remote procedure call;

FIG. 3 is a logical representation of operation of a remote procedure call as in FIG. 3;

FIG. 4 is a logical representation of a name service in the system of FIG. 1, according to the invention;

FIG. 5 is a logical representation of a configuration profile used with the name service of FIG. 4, according to the invention;

DETAILED DESCRIPTION OF SPECIFIC EMBODIMENTS

Figure 6:
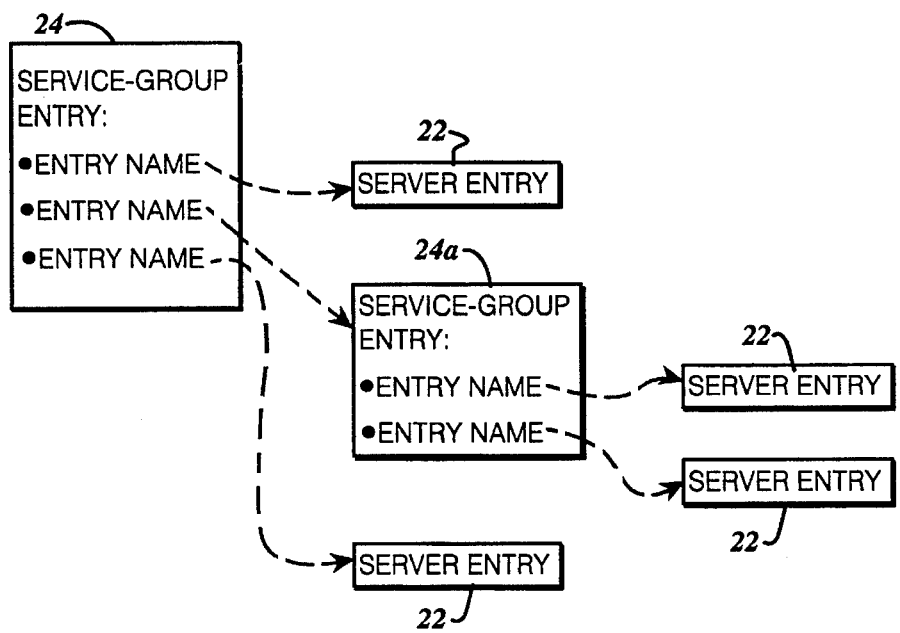
FIG. 6 is a logical representation of a service group entry in the name service of FIG. 4.

Referring to FIG. 1, a computer network or distributed system is shown which may use features of the invention. A network including a communications link 10 is used to provide a communication path between a number of processors or computers including clients 11, each of which may be a single host computer or may be connected to a number of terminals or user nodes 12. The communications link may be a single local loop or bus (i.e., a local area network), or may coupled by bridges 13 to more remote networks 10a, and/or by a microwave or satellite link 14 to other remote networks 10b (i.e., in a wide area network). Each one of the clients 11 (and the terminals 12) is assumed to be a processor executing its own code with its own local memory, and each processor may communicate with each of the others via the path 10, using a communications protocol which ordinarily involves message packets. Services are available on this network 10, 10a and 10b through servers 15 identified as server-1, server-2, server-3, etc. Each of the servers 15 provides one or more services 16 to the network, with these services being identified as service-A, service-B, service-C, etc. These services may be hardware facilities, such as high speed printers, back-up disks, or the like, or may be software facilities, such as name services, global data base utilities, or the like. As discussed below, the services 16 may be remote procedure calls. Note that the services 16 may be duplicated on the network. Service-A is seen to be available at both server-1 and server-3 on the local network 10, and at server-4 on the remote network 10a, as well as server-6 on the remote network 10b. A client 11 has access to service-A from any one of the servers 15 providing the service-A, but it may be more efficient to utilize the local server-1 or server-3 if not busy, since the response time is quicker and the communication facility is less burdened.

The clients 11 or user terminals 12 may be personal computers, workstations, modems connected to remote users, video display terminals, point-of-sale terminals, automated teller machines, or any of a variety of such devices. The links 10, 10a or 10b between clients 11 and servers 15 may be local area networks using technologies such as Ethernet, token ring, FDDI, StarLan, or the like, or in some cases may be merely RS232 type or backplane connections. The physical construction of the communications links 10, 10a or 10b can be of various types, such as coaxial cable, twisted pair, fiber optics, or the like. The communication method and protocol employed can also be of various types, such as DECnet, OSI, or TCP/IP, for example (i.e., higher level protocol services). While these commonly-used communications methods are based on bit-serial transmission on the link 10, the features of the invention are applicable as well to communications methods using parallel data transmission on the link. Of course, the communications link 10 may include bulk transfer facilities (trunk lines) using multiplexing, such as T1 circuits or the like. Or, a bulk transfer facility may be one of the services represented by the services 16. The communications network represented in FIG. 1 may service hundreds or thousands of clients, user terminals and servers, depending upon the installation. Since the network 10 of FIG. 1 may be connected to other such networks 10a and 10b by bridges and/or wireless links (either represented by services 16 or otherwise, i.e., transparent to the protocol), the number of users and the number of service providers can be quite large.

In a preferred embodiment of the invention, each of the processors 11 and 12 and the servers 15 is able to make remote procedure calls to the other processors, and the services 16 may themselves be remote procedures which may be called from other processors on the network; alternatively, remote procedure calls executed on the servers 15 may be used to access the services 16 (as well as for other purposes). A remote procedure call (RPC) is a procedure call mechanism, extended to provide transfer of control and/or data across communication networks such as the network 10 of FIG. 1. Referring to FIG. 2, if a process A (or a thread within a process) is executing in processor 11a, it can make a local call to procedure B in the address space of processor 11a, or make a remote call to a procedure C in the address space of processor 15a via RPC facility 17 and network 10 using the communications layer 18. Execution of the process A is suspended when the remote call is made, and then the procedure C executes, returning data to the process A where execution recommences. Note that for remote procedure calls, there is no shared memory; the procedures are ordinarily in two physically separate computers. Therefore, the parameters passed back and forth must be actual values rather than pointers, i.e., the data must be copied from machine to machine. Ordinarily the RPC mechanism is transparent to the user (i.e., to the writer of source code for an applications program); the structure of the call is the same (from the standpoint of the process A) whether the call is local or remote. When the call is actually executed, however, the system must introduce an address of the remote procedure C so that message packets can be made up by the communication layer to send over the network 10. Providing this address is called "binding".

Referring to FIG. 3, a program structure for remote procedure calls is based upon the concept of stubs. When making a remote call, five pieces of program are involved: the user program A (as in FIG. 2), the user stub $A_s$, and one instance of RPCRuntime 17 execute in the caller machine 11a. The server procedure C, the server stub $C_s$, and another instance of RPCRuntime 17 execute in the callee machine 15a. When the user program A wishes to make a remote procedure call, it makes a local call which invokes a corresponding procedure in the user stub $A_s$. The user stub is responsible for placing a specification of the target procedure and arguments into one or more packets and asking RPCRuntime 17 to transmit these reliably to the callee machine 15a via network 10. On receipt of these packets, the RPCRuntime 17 in the callee machine 15a passes them to the server stub $C_s$ which unpacks them and makes a local call to invoke the appropriate procedure in the server procedure C. Meanwhile, the calling process A in the caller machine is suspended awaiting a result packet. When the call in the server procedure C completes, it returns to the server stub $C_s$ and the results are passed back to the suspended process A in the caller machine 11a, via the user stub A, which unpacks them. The RPCRuntime program 17 is responsible for retransmissions, acknowledgements, packet routing, and encryption, either directly or in combination with lower level services offered in the network. Apart from the effects of intermachine binding, the call happens just as if the user had invoked the procedure in the server directly; indeed, if the user code A and server code C were brought into a single machine and bound directly together without the stubs $A_s$ and $C_s$ the program would still work. The RPCRuntime program is described by Birrell et al in "Implementing Remote Procedure Calls", ACM Transactions on Computer Systems, February, 1984, pp. 39–50.

The remote interactions are defined in an interface declaration, which is essentially a set of (abstract) procedure definitions of the remote service or program, combined with other relevant specification information. It defines the remote interface between the user and provider of the remote service; the interface declaration should be expressed in an interface specification language which allows heterogeneous implementations of the programs which provide and use the declared interface. The programmer of the user code and server code need not be concerned with creating the stubs or with the communications of packing and unpacking, but merely must avoid specifying arguments or results that are incompatible with the lack of shared address space. The programmer must also take steps to invoke intermachine binding, and to resolve occurrences of network failure or failure of the server.

There are two aspects of binding to consider. First, the client or caller machine 11a must specify what service it is to be bound to, and this is a question of naming. Secondly, the client must determine the machine address of a particular callee or server, which is a question of location, and specify to this callee the procedure to be invoked. The binding operation is to bind an importer of an interface to an exporter of an interface; after binding, calls made by the importer invoke procedures implemented by the remote exporter.

The communications network 10 and communications layers 18 illustrated in FIGS. 1 and 2, in one embodiment, might be generally of the type disclosed in the above-mentioned U.S. Pat. No. 4,823,122, which is incorporated herein by reference; this type of network executes a local area protocol. The communications protocol described in the patent may make use of virtual circuits to define a two-way path between a particular server client and a particular node or server 15. A feature of the protocol described in the U.S. Pat. No. 4,823,122 is the use of advertising messages sent periodically by the service providers to advise all clients of what services are available on the network. To this end, a service advertising message is sent periodically by each service provider, by which it identifies itself (by network address) and the service or services provided at its node. The service advertising message contains information such as identification of the transmitting node (one of the servers 15, for example), a type field identifying this message as a service advertising message, and a multi-cast address field enabling all of the nodes to receive the message if desired. In the body of the advertising message each of the one or more services provided at this node is identified. The method described in the patent, however, places a burden on the communications link and imposes overhead upon each client node in keeping track of the service providers, especially in wide area networks having a large number of stations.

To provide the actual network addresses of facilities on the network 10, a name service 20 is provided as one of the services 16 on a network of FIG. 1, available to all users via a server 15. The network address of the name server 20 is always made available to a user 11, 12 or 15 upon sign-on or boot-up, so inquiries can be made to the name server 20 to obtain a network address for any service or procedure or function for which the user has a name or an alias or generic name. A primitive way of using the name service 20 would be for it to collect service advertisements as discussed above, rather than this burden being imposed upon local clients 11. Another way is for the service providers to export their availability, i.e., export an interface identifier as described below. In any event, the name service is a commonly-used utility on communications networks, and acts as a database, collecting actual network addresses for services (or other named elements) on the network and responding to inquiries by looking up data in its database and returning information found.

In the network of FIG. 1, where a number of instances of various services, such as service-A, may be available at various physical locations, the name service 20 or RPC client must have some mechanism for selecting one or the other of these instances when an inquiry is made. For example, when an application is distributed, copies of the server (services 16) are installed on several systems (servers 15) whose locations are unknown to clients 11. To use a service, a client 11 must find a compatible server 15, that is, a server that offers a given RPC interface and any resource, such as a database, that the client 11 requests. Services 16 (via their servers 15) use the name service 20 to advertise themselves to clients 11, this name service being a repository of information about computing resources. Referring to FIG. 4, the name service 20 maintains a network-wide database 21 called a namespace which stores information for applications for each distributed computing environment. Note that there may be more than one distributed computing environment, and thus more than one name service 20 and namespace 21, existing on a network such as that of FIG. 1 at a given time, but only one will be treated herein; also, the name service database may be partitioned or replicated—it need not be one server. To find information in the namespace 21, a client 11 must access the name service 20 that maintains the namespace 21. Information about a service 16 and its applications is placed in a server entry 22 in the namespace 21, by an operation invoked by system management, by an applications program, or by the server exporting the information. This information includes location (network address), and the RPC interfaces and resources it offers. The name server 20 handles requests from clients 11 (received via messages over link 10) for information, returning (via messages) the information about a service 16 that satisfies the client's needs, if such an entry 22 exists.

According to the invention, an entry maintained by the name service 20 for a client 11 (or group of clients), to list a subset of the services 16 available to this client, may be a "configuration profile" as seen in FIG. 5. A configuration profile 23 is a data entry in the namespace 21 in the form of a priority-ordered search list, keyed by service so it can contain information for multiple services 16. Each item 23a, 23b, etc., in a configuration profile 23 represents a service 16 and may contain server entries 22, service group entries 24, or other configuration profile entries 25 (as described below).

When more than one instance of a service is available on a network, the naming service 20 may be set up by an applications manager to define a service group entry 24 as seen in FIGS. 5 and 6. A service group is composed of the identities of an arbitrary set of the servers 15 which offer a service 16; the applications manager decides that this set should be treated as a group. In addition, a service group entry 24 can include the identity of another service group entry 24a. Defining one or more service groups for a service flees clients 11 from dependence on any one server 15. When a client 11 requests an RPC interface which corresponds to a service group, the name service 20 looks up (in the service group entry 24) information about the alternative servers, selects a compatible server 15 according to some predefined selection algorithm, and returns the binding (network address) to the client 11. The algorithm is designed to share the load across a number of potential servers.

The name service 20 supports configuration profiles 23, according to the invention. Referring to FIG. 5, a configuration profile 22 provides a mechanism for directing lookup operations in a name service. This lookup in a configuration profile is by service (i.e., RPC interface ID) requested, rather than by the name of server or object. A configuration profile 22 contains information about the names of servers 15 that offer a given RPC interface and associated resources. In a configuration profile 23, the ID of an RPC interface corresponds to a list of server entries 22, service group entries 24, and/or other configuration profile entries 25. In turn, the service group entries 24 contain server entries as described above for service groups, and the configuration profile entries contain server entries, service group entries and/or still other configuration profile entries.

A namespace configuration profile entry 23 in the name service 20 can thus be of three types (or a composite of these three types), as described: (1) a server entry 22 corresponding to a single instance of a server 15 running in its own address space—as part of a server's startup, it creates or verifies a server entry 22 in a name service 20, placing the ID and versions of each interface it offers in that entry, along with at least one binding for the interface, and optionally, a server entry 22 can also contain the object ID of any resource that the server can access; (2) a service-group entry 24 identifying a set of servers; (3) a configuration-profile entry identifying servers, service groups and/or other configuration profiles for an interface. When all types of entries are available, a client 11 importing a service interface searches for bindings by processing entries in the following order: (1) server entries, (2) service groups, and (3) configuration profiles. Although this order of processing is preferred, another order may be selected.

An object in the namespace 21 may contain many attributes, some created by RPC services, some created by other applications. Thus, while one attribute qualifies an object as a server entry, another may qualify the same object as a service-group entry, a configuration-profile entry, or some other non-RPC entry. An item 22 in the namespace 21 thus has at least one attribute field to qualify the object. One of these attribute fields may be a "priority" attribute, so that when the information is returned to the client the entries can be selected according to priority. For example, if there are several servers identified a priority 1, these will be tried first (in pseudo-random or perhaps some deterministic order), and if none of these satisfy the requirements for supplying the service, then the ones have priority-2 attribute are tried, etc. The priority attributes are ordinarily added or modified by the manager, although the client can be given access to generate his own configuration profile with selected priority attributes.

Figure 7:
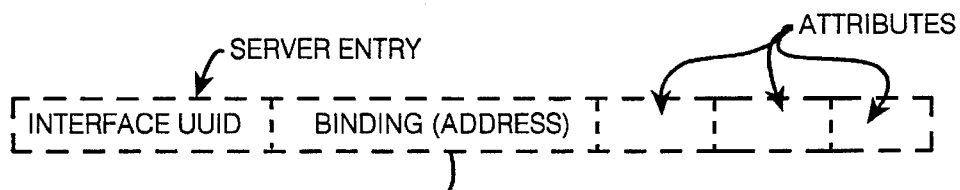
FIGS. 7 and 7a are logical representations of a server entry in the name service of FIG. 4.
Figure 7A:
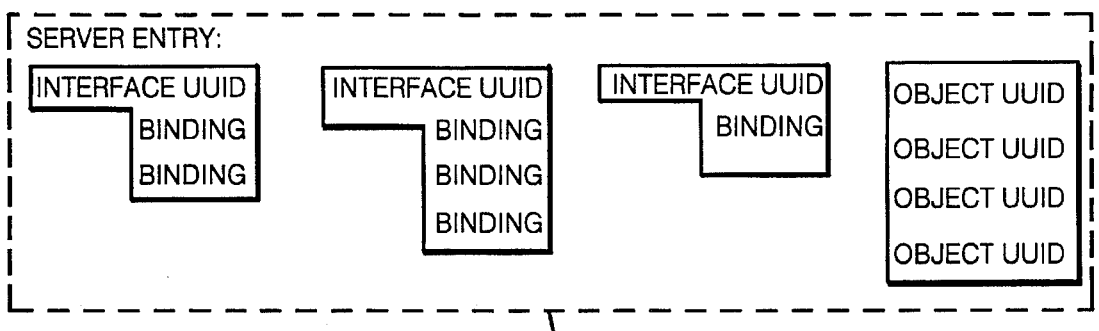

A server entry 22 is illustrated in more detail in FIGS. 7 and 7a. A server entry may be merely one interface ID and its binding as seen in FIG. 7, or may have multiple interface IDs and bindings as seen in FIG. 7a. The name service 20 allows an application to create and reference each namespace entry 22 by name. For each RPC interface exported by an RPC server 15, a server entry 22 maintained by the name service 20 contains (1) one or more interface IDs, and (2) one or more bindings to the server 15, where a binding is a network address. A single entry 22 can contain multiple IDs and versions, each with its own set of bindings, and, in addition, a server entry optionally can contain a set of RPC object IDs, each of which corresponds to a specific resource offered by the server 15, as seen in FIG. 7a. When importing any RPC interface offered by the server, a client 11 can request any of the object IDs in a server entry. To import an RPC interface a client specifies a name-service entry (or group, or service group, or interface).

The name service operations used in connection with the configuration profiles of the invention are: (1) exporting, (2) managing service groups and configuration profiles, (3) importing, and (4) unexporting.

Exporting is an operation by which a server 15 places information about an interface in a designated namespace 21, to publicly advertise a service 16 for use by any application running on a client 11. Optionally, the server can specify the object IDs of resources offered by that service. Unexporting is an operation by which a server 15 removes one or more bindings (or resources) from a server entry 22.

In managing service groups and configuration profiles, clients 11, servers 15 and independent management modules (not shown) can use the name service 20 for accessing a namespace 21 to create, update, look up, and remove server entries 22, service group entries 24 and configuration profile entries 23, subject to access control.

Importing is an operation by which the name service finds a binding that meets specific criteria specified by a client and returns that binding to the client. The selection is under some circumstances quasi-random, under others deterministic.

A feature needed in the management of configuration profiles is a mechanism for cycle checking, meaning that when a configuration profile is added or modified, the contents of each nested configuration profile are compared to make sure one doesn't contain an entry referring back to another configuration profile in the same chain, which would produce a condition of an infinite loop.

As thus described, a configuration profile is an optional, set-valued attribute of any entry in the distributed namespace 21. Each set member specifies a service or resource 16, via an interfaceUUID (Universal Unique Identifier) and interface version, acting as a lookup key within the profile. A comment field is used to contain the name of the interface. The name of the service interface is derived from the name attribute in an RPC interface definition file; this is a local name, possibly ambiguous. Each member also specifies the name of a service provider, and a priority. It is expected that profiles will most frequently be used for RPC services, although other services or resources can use them by simply creating their own UUIDs. Service provider names refer either to individual servers, service groups, or other profiles. Name service entries for individual servers contain their protocol towers (a data structure representing the address of the server and the hierarchy of network protocols used), including addresses; entries for service groups contain a list of 'equivalent' servers (which can contain names of other service groups); servers, service groups, and profiles are all represented in the name service as distinguished attributes on any name service entry. The priority value specifies a search priority that can be used to group members of equal priority. The nullUUID interface is used as a default profile pointer.

There are two categories of profile operations. The first are the primitive application program interface operations used to manipulate the profiles—create the attributes, add members, delete members, read members, etc. These are all, conceptually, management operations done by a knowledgeable site or group or organization administrator. But they could be embedded in actual RPC servers.

The second category of profile operations are the query (import or lookup) operations that resolve a profile request. The query operations require a single piece of configuration information (provided at boot-up by boot code, or provided by a manual entry) which is the starting profile. First, the starting profile is read. If it contains members for the requested service, the highest priority members listed are grouped together. Service groups and other profiles are elaborated, in a specified order. From the equal priority grouping, a semi-random selection is returned. If the Import or other query operation is satisfied, the query is done. If not, subsequent selections from the equal priority group are returned. This process continues until either the query is satisfied or all equal priority members are exhausted. If the latter, then the next lower priority subset is gathered, and the selection iteration continues.

If a profile member points to another profile, it will be similarly elaborated. Profiles can be chained together in a hierarchy in this fashion. If none of the members for the specified interface satisfy the query, or there are no members for the specified interface, the query continues via following the default interface (null UUID) profile members. The query operation detects cycles; this cannot simply be done when profiles are created, since the native name service access could also be used to manipulate profiles, but doesn't understand their semantics so wouldn't be able to check for cycles.

Configuration profiles are transparent to server applications and are transparent to client applications using RPC import or lookup operations. These client applications simply denote the service desired, and the operations begin the profile search with the starting profile. This—the starting profile—is the only one piece of information required for access to numerous services. It can be explicitly specified or implicitly read from an environment variable or similar mechanism.

Thus when a new system is unpacked and connected to the network, the user must learn and enter into his system a starting profile. This would typically be the user's or system's profile, and would be null except for a default profile entry pointing to a group or site profile already defined. The site profile would normally include a default organization profile, etc. So with this one piece of configuration information, the new system can make use of any of the RPC services available through the entire defined search tree hierarchy of profiles.

Since the configuration profiles are stored in the distributed name service, they greatly simplify the installation of new systems. A distributed system manager can install a new system in the environment and give it access to all the resources by simply providing the new system the name of its starting profile for the environment. Similarly, a new user can be configured by creating a new profile that is null except to link to a default profile as its parent.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A distributed computing system, comprising:

a communications network having a number of clients and a number of service providers connected thereto, each service provider supplying one or more services, wherein each client is able to send data to and receive data from each of said service providers via said network using a unique network address;

one of said service providers providing a name service, said name service being a database service containing entries for each of said service providers and receiving inquiries from said clients for the identity of said service providers referenced by service name and returning information identifying said service providers by network address;

said name service including in said database configuration profiles for at least one client, each configuration profile comprising a plurality of hierarchically-arranged entries including:

one or more server entries each defining a network address of one of said service providers;

one or more service groups, each service group defining a plurality of said server entries; and one or more other configuration profiles;

each of said entries of each of said configuration profile of said name service containing priority information to determine the order of use of said network addresses by said client after receipt of said inquiries by said name service;

and means for identifying for said client a selected one or more of said configuration profiles for reference upon making said inquiries.

2. A system according to claim 1 wherein said communications network includes a local area network and a wide area network, and wherein at least some of said services are duplicated on said local area network and/or on said wide area network.

3. A system according to claim 1 wherein said services include remote procedure calls, and said server entries include interface names for said remote procedure calls.

4. A system according to claim 1 wherein said entries of each said configuration profile make up a priority-ordered search list.

5. A communications network comprising:

a) a communications link;

b) a plurality of clients coupled to said communications link;

c) a plurality of service providers coupled to said communications network;

d) each one of said clients and each one of said service providers including processing means executing a separate instruction stream, and each one of said clients and each one of said service providers having a unique network address on said network;

e) each one of said clients and each one of said service providers having means for making remote procedure calls to said service providers via said communications link, when executing said instruction stream;

f) each one of said clients and each one of said service providers having means for sending and receiving messages to other clients and service providers via said communications link using said network addresses, said messages being employed in making said remote procedure calls;

g) one of said service providers being a name service functioning to return a message containing the network address of a particular one of said service providers in reply to a message from one of said clients giving the name of said service;

h) and means included in said name service to maintain a plurality of configuration profiles, each one of said configuration profiles being configured for at least one of said clients, each one of said configuration profiles comprising a priority-ordered hierarchical search list for mapping service names into said service providers for said at least one of said clients, each configuration profile including a priority-ordered list of:

one or more server entries each defining a network address of one of said service providers;

one or more service groups, each service group defining a plurality of said server entries; and one or more other configuration profiles;

i) means for associating each one of said configuration profiles with a given client;

j) and means in said name service to return said network addresses to said given client upon receipt of inquiries by said name service from said given client, for user by said client in response to said priority-ordered list.

6. A network according to claim 5 wherein said service provider is identified in said service entry as a remote procedure call interface specification.

7. A network according to claim 5 wherein said communications network includes a local area network and a wide area network, and wherein at least some of said services are duplicated on said local area network and/or on said wide area network.

8. A network according to claim 5 wherein said service names include alphabetical names and numeric names.

9. A method of selecting resources in a distributed computing system, comprising the steps of:

receiving from a client a request to access a service;

searching by a service name in response to said request a configuration profile customized for use by such client to select a service provider capable of providing said requested service from a group of service providers offering said requested service, said step of searching said configuration profile comprising:

reading entries in said configuration profile corresponding to said service name;

selecting a service provider based on a selected priority value when said read entries are server entries or service group entries;

selecting other service providers having said selected priority value if the selected service provider cannot supply the requested service;

continuing the searching using a next lower priority value when said service providers for said selected value have been exhausted without finding a capable service provider;

repeating the above steps for one or more other configuration profiles when said configuration profile is hierarchically linked to such one or more other configuration profiles until said searching succeeds in finding a capable service provider or fails; and if said searching succeeds, accessing said requested service by said client from said selected capable service provider.

10. A method according to claim 9 wherein said service is a remote procedure call and said service providers for said remote procedure call are addressed using remote procedure call interface specifications in said configuration profile.

* * * * *